United States Patent
Martin

(10) Patent No.: US 6,410,621 B1
(45) Date of Patent: Jun. 25, 2002

(54) FLAME-RETARDANT MOULDED COMPONENT

(75) Inventor: Lee Hamilton Martin, West Chester, PA (US)

(73) Assignee: T&N Technology Limited, Rugby (GB)

(*) Notice: Subject to any disclaimer, the term of this patent is extended or adjusted under 35 U.S.C. 154(b) by 0 days.

(21) Appl. No.: 09/171,611

(22) PCT Filed: Apr. 29, 1997

(86) PCT No.: PCT/GB97/01171

§ 371 (c)(1),
(2), (4) Date: Oct. 22, 1998

(87) PCT Pub. No.: WO97/42264

PCT Pub. Date: Nov. 13, 1997

(30) Foreign Application Priority Data

May 8, 1996 (GB) .............................. 9609606

(51) Int. Cl.[7] ..................... C08K 5/3477; C08K 5/521
(52) U.S. Cl. ................. 524/101; 524/123; 524/125
(58) Field of Search ................ 524/125, 101, 524/123

(56) References Cited

U.S. PATENT DOCUMENTS

| | | | |
|---|---|---|---|
| 4,035,442 A | 7/1977 | Dunworth | 260/860 |
| 4,257,931 A | 3/1981 | Granzow | 260/45.8 NE |
| 4,788,259 A | * 11/1988 | Nielinger et al. | 524/123 |
| 4,866,114 A | 9/1989 | Taubitz et al. | 524/100 |
| 5,837,760 A | * 11/1998 | Hackl et al. | 524/127 |
| 5,859,147 A | * 1/1999 | Torre et al. | 524/123 |

FOREIGN PATENT DOCUMENTS

| | | | |
|---|---|---|---|
| EP | 0 005 329 | 11/1979 | C07F/9/40 |
| EP | 0 324 356 | 7/1989 | C08L/67/02 |
| EP | 0 530 874 | 3/1993 | C07F/9/6571 |
| EP | 0 617 079 | 9/1994 | C08K/5/521 |
| WO | 96/30441 | 10/1996 | C08K/5/51 |

OTHER PUBLICATIONS

Patent Abstracts of Japan, vol. 095, No. 004, May 31, 1995 & JP 07 003134 A (Toray Ind Inc), Jan. 6, 1995.

Patent Abstracts of Japan, vol. 096, No. 003, Mar. 29, 1996 & JP 07 300562 A (Toray Ind Inc), Nov. 14, 1995.

Patent Abstracts of Japan, vol. 18, No. 182 (C-1184), Mar. 29, 1994 & JP 05 339417 A (Asahi), Dec. 21, 1993.

* cited by examiner

*Primary Examiner*—Peter Szekely
(74) *Attorney, Agent, or Firm*—Synnestvedt & Lechner LLP

(57) ABSTRACT

A flame-retardant molded component comprises a matrix-forming polymer material. The component also comprises 5 to 20 wt % of melamine cyanurate and 3 to 10 wt % of a polyphosphonate.

4 Claims, No Drawings

FLAME-RETARDANT MOULDED COMPONENT

This invention is concerned with a flame-retardant molded component. The invention is particularly applicable to monofilaments for formation into braided sleeves used to protect electrical wires or pipes.

It is well-known to form molded components from polymers such as nylon 6. For example, braided sleeves used for protecting wires or pipes from abrasion damage, for example in an engine compartment of a vehicle, are often formed from monofilaments of nylon 6. The monofilaments have a diameter of about 0.25 mm to about 3.25 mm.

It is also well-known to provide polyamides, eg nylon 6 or nylon 66, or other polymers with flame-retardancy properties by filling them with flame-retardant materials. Typical applications include molded containers for electrical equipment and coatings for electrical wires. Melamine cyanurate is a known flame-retardant filler for use in polyamides for such applications. In the event of fire, the melamine cyanurate decomposes giving off flame-retardant gases. However, as the proportion of melamine cyanurate increases, the flexibility and surface quality of the material decreases making the material prone to cracking. For this reason, providing sufficient melamine cyanurate for the required flame-retardancy renders the material unsuitable for many uses, for example for forming into the above-mentioned monofilaments. For this reason, the protective sleeves referred to above are not formed from flame-retardant monofilaments despite the obvious fire risks present in engine compartments.

Polyphosphonates are known as flame-retardant fillers in some polymeric matrices. However, they are not effective enough, when used alone, to enable a molded component to pass flame-retardancy tests.

It is an object of the present invention to provide a flame-retardant molded component which combines good flame-retardancy properties with good flexibility and good surface quality.

The invention provides a flame-retardant molded component comprising a matrix-forming polymer material, characterised in that the component also comprises 5 to 20 wt % of melamine cyanurate, and 3–10 wt % of a polyphosphonate.

In a component according to the invention, it is found that the presence of both melamine cyanurate and a polyphosphonate enables a greater proportion of melamine cyanurate to be included before the flexibility and surface quality become unacceptable. Furthermore, since, the polyphosphonate itself has flame-retardancy properties, the quantity of melamine cyanurate required is reduced. The polyphosphonate also acts as a plasticiser improving the mechanical properties of the component and assisting the dispersion of the melamine cyanurate. In particular, it is found that the component can be molded in the form of a successful flame-retardant monofilament.

Preferably, the quantity of polyphosphonate is 3–10 wt %.

The matrix of a component according to the invention is, preferably, formed from nylon 6 but nylon 12 or 66 are also possible. Also possible are poly (ethylene terephthalate) and poly (ethylene naphthalate).

The polyphosphonate is preferably an organo polyphosphate called Amguard P45 and obtainable from Albright & Wilson.

There now follows a detailed description of an example which is illustrative of the invention.

In the example, 85 wt % of nylon 6 was compounded with 10 wt % of melamine cyanurate, in the form of particles averaging 10 microns in diameter, and with 5 wt % of Amguard P45. The mixture was extruded as a monofilament having a diameter of 3.25 mm. This monofilament was braided into a protective sleeve in a conventional manner.

The sleeve achieved the UL1441 VW-1 requirements for electrical sleeving and passed the UL94 Vo standard for flame retardancy at 0.8 mm thickness. The monofilaments had good flexibility and surface quality.

What is claimed is:

1. A flame-retardant nylon monofilament formed by a process comprising the steps of:
    compounding a mixture consisting essentially of 5 to 20 weight percent melamine cyanurate and 3 to 10 weight percent of an organopolyphosphonate, with the balance being a polymer selected from the group consisting of Nylon 6, Nylon 12 and Nylon 66; and
    extruding as a monofilament said compounded mixture.
2. The flame retardant nylon monofilament of claim 1, comprising from 5 to 15 weight percent of melamine cyanurate.
3. The flame retardant nylon monofilament of claim 2, comprising 10 weight percent of melamine cyanurate and 5 weight percent of organopolyphosphonate.
4. The flame retardant monofilament of claim 1, wherein said polymer is Nylon 6.

\* \* \* \* \*